(12) United States Patent
Verjus et al.

(10) Patent No.: US 8,451,436 B2
(45) Date of Patent: May 28, 2013

(54) METHOD AND APPARATUS TO DEFINE THE VELOCITY OF A FLOWING FLUID

(75) Inventors: Christophe Verjus, Neuchâtel (CH); Philippe Renevey, Lausanne (CH); Victor Neuman, Cormondréche (CH)

(73) Assignee: Digmesa AG, Ipsach (CH)

( * ) Notice: Subject to any disclaimer, the term of this patent is extended or adjusted under 35 U.S.C. 154(b) by 345 days.

(21) Appl. No.: 12/742,849

(22) PCT Filed: Nov. 13, 2008

(86) PCT No.: PCT/EP2008/009579
§ 371 (c)(1),
(2), (4) Date: Aug. 17, 2010

(87) PCT Pub. No.: WO2009/062708
PCT Pub. Date: May 22, 2009

(65) Prior Publication Data
US 2010/0319450 A1    Dec. 23, 2010

(30) Foreign Application Priority Data
Nov. 14, 2007   (DE) .......................... 10 2007 054 186

(51) Int. Cl.
*G01J 1/00* (2006.01)
*G01N 21/00* (2006.01)

(52) U.S. Cl.
USPC .......................................... 356/213; 356/432

(58) Field of Classification Search
USPC .......................................... 356/213, 432–444
See application file for complete search history.

(56) References Cited

U.S. PATENT DOCUMENTS

| 4,213,699 A | 7/1980 | Moore |
| 4,654,803 A * | 3/1987 | Sell ................................ 702/49 |
| 5,513,006 A | 4/1996 | Schulz et al. |
| 5,865,871 A * | 2/1999 | Simundich ...................... 73/861 |
| 7,230,708 B2 * | 6/2007 | Lapotko et al. ............... 356/432 |

FOREIGN PATENT DOCUMENTS

| DE | 103 56 443 A1 | 7/2005 |
| EP | 1 418 420 A1 | 5/2004 |
| JP | H08-507367 A | 8/1996 |
| JP | 9-113531 A | 5/1997 |
| JP | 2002-365252 A | 12/2002 |
| JP | 2004-361379 A | 12/2004 |
| WO | WO 2005/054787 A2 | 6/2005 |

* cited by examiner

*Primary Examiner* — Gregory J Toatley
*Assistant Examiner* — Shawn Decenzo
(74) *Attorney, Agent, or Firm* — McGlew and Tuttle, P.C.

(57) ABSTRACT

To determine as precisely as possible the flow rate of a liquid flow inside a tube by means of minimal technical and especially minimal apparatus complexity the invention provides with a procedure and an apparatus to determine it. In this process the liquid is heated by means of an optical heating beam while the point of heating is shown through by an optical detection ray. The axis of the heating- and the detection beam coincide at least in the point of heating. The detection beam is absorbed via an array of detectors. In the apparatus the heating device which heats the interior area of a limited internal area of the liquid and the optical control unit of the laser beam are arranged that way that a measuring beam shines through the absolute heating point.

31 Claims, 7 Drawing Sheets

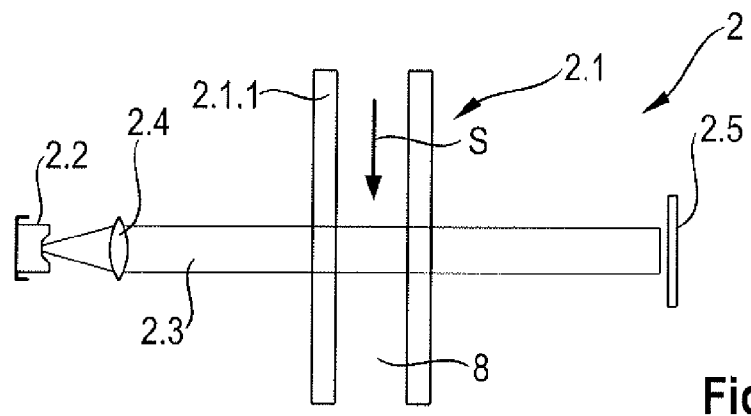
Fig. 2.1
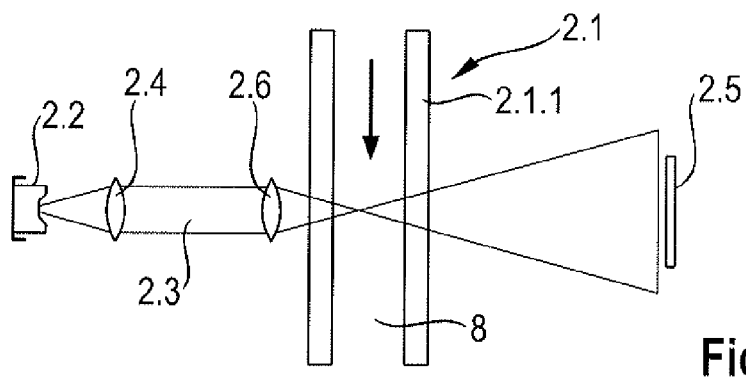
Fig. 2.2
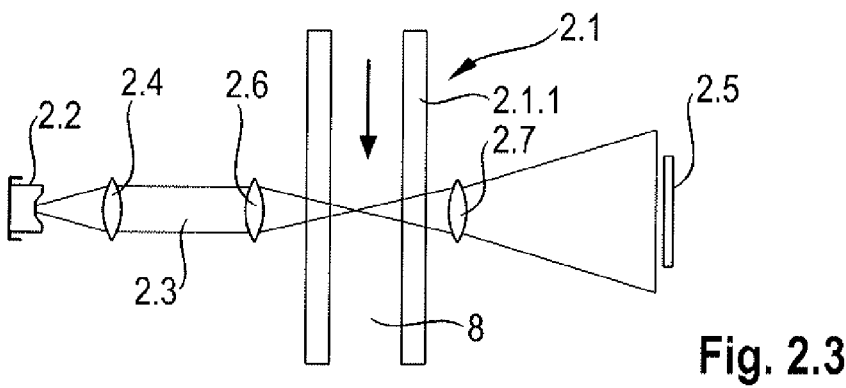
Fig. 2.3
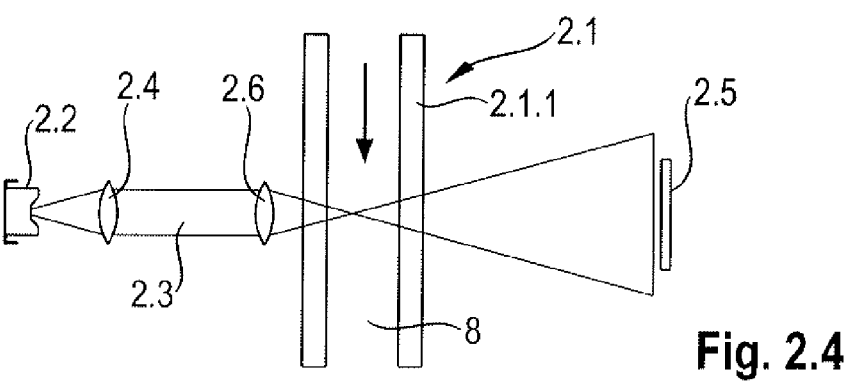
Fig. 2.4

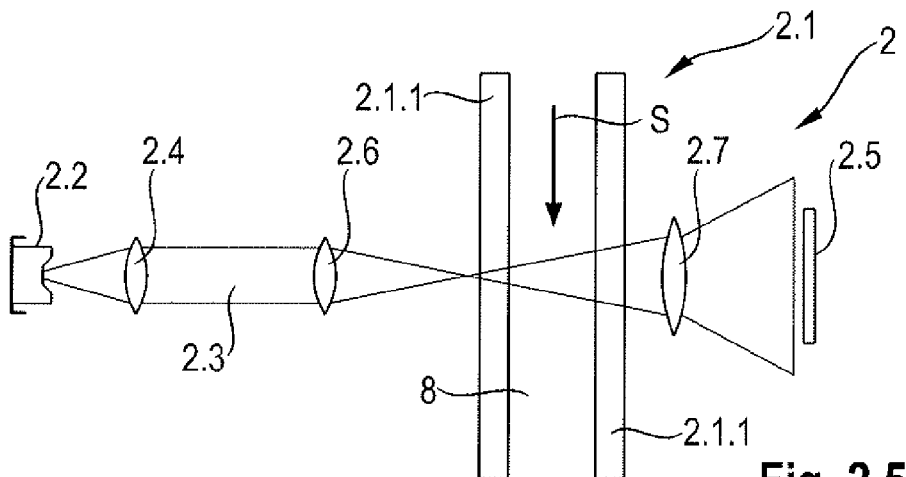
Fig. 2.5
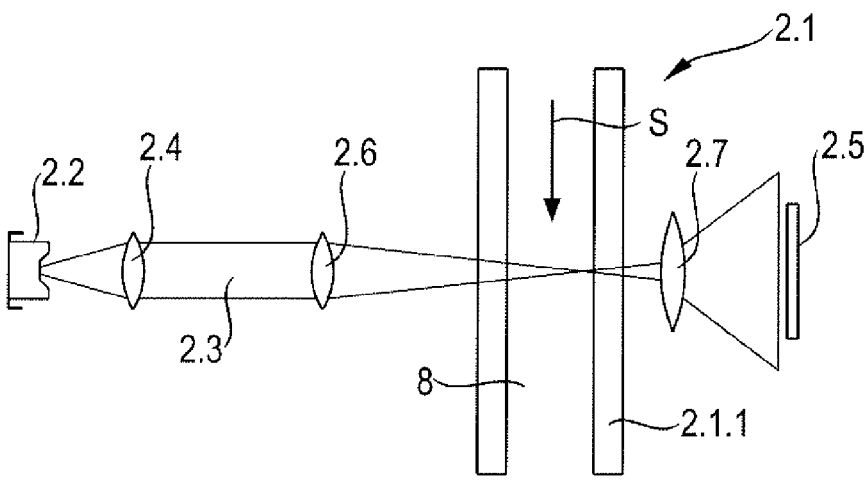
Fig. 2.6
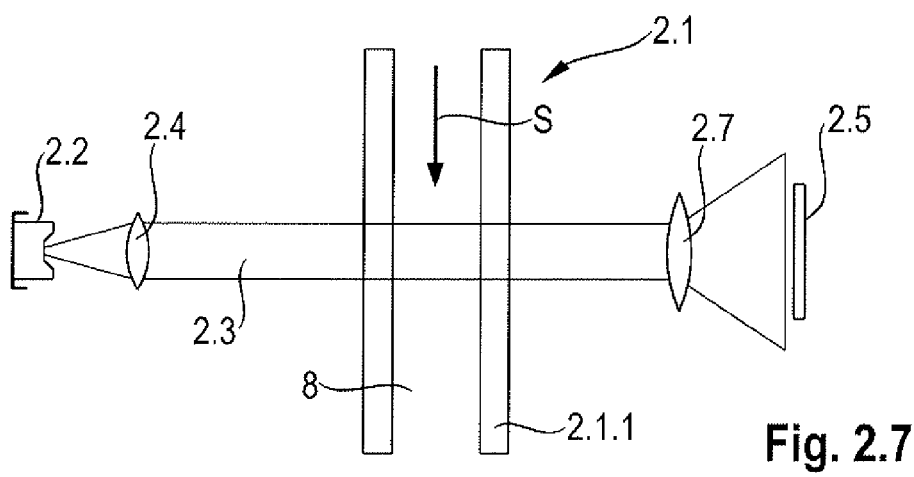
Fig. 2.7

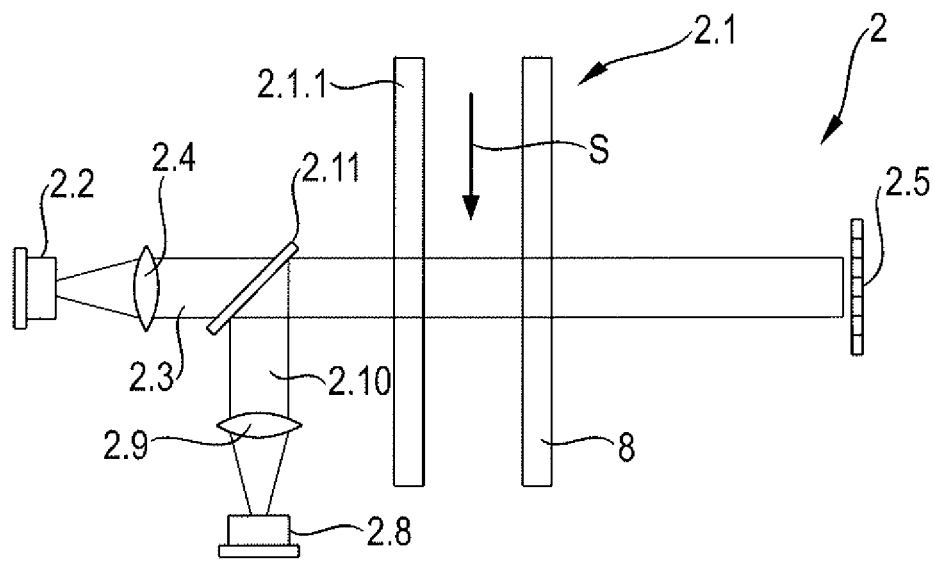
Fig. 3.1
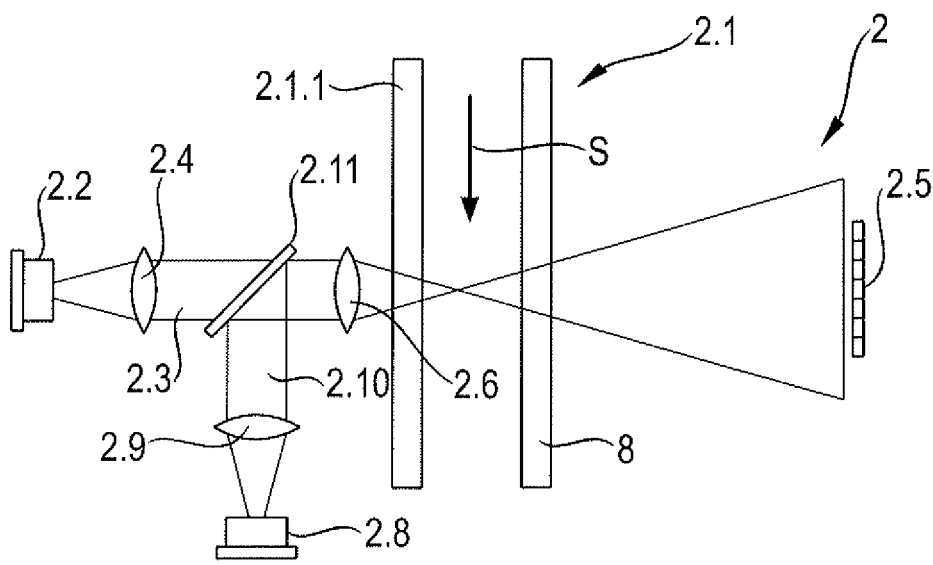
Fig. 3.2

METHOD AND APPARATUS TO DEFINE THE VELOCITY OF A FLOWING FLUID

CROSS REFERENCE TO RELATED APPLICATIONS

This application is a United States National Phase application of International Application PCT/EP2009/009579 and claims the benefit of priority under 35 U.S.C. §119 of German patent application DE 10 2007 054 186.6 filed Nov. 14, 2007, the entire contents of which are incorporated herein by reference.

FIELD OF THE INVENTION

This invention relates to a method and apparatus to define the velocity of a flowing liquid.

BACKGROUND OF THE INVENTION

Other generic kind of procedures and systems of different makes are known.

Therefore it is known that the deflection of a—small—laser beam which is sent through a heated zone of a liquid can be used to measure the velocity of the liquid. The heated zone of the liquid is warmed up by a different device than the laser.

Alternatively, it is known how to measure the flow velocity of a liquid if necessary by means of a down-stream array of optical detectors and an optically produced heating point during the running time of a temporarily heated area from the heating point to the measuring point.

Disadvantageously, in this case two different workspace locations as well as working equipments are needed: the heating system and the heating detection system. The invention has therefore the aim to develop an improved procedure as well as a developed apparatus to define the velocity of a flowing liquid and to avoid the disadvantages mentioned before.

SUMMARY OF THE INVENTION

In accordance with an invention like the one initially mentioned the requirement named before is solved that way that the liquid will be heated by means of an optical heating ray. The heating spot will be radiated by an optical detection ray. The optical axis of the heating ray and the detection ray will at least correspond in the heating spot. The detection ray will be taken by an array of detectors.

To fulfil the above mentioned requirement the invention will include an apparatus in which the device to heat a limited area of the interior of the liquid (8) and an optical device (2.4, 2.6) to guide the optical beam (2.3) of the laser (2.2) are positioned such that a measuring beam (2.3) radiates the heated area in its absolute point of heating.

Flow defines one for this typical dimension, like rate of flow, velocity, volume flow rate and similar. By partly absorbing an optical beam, e.g. a laser beam, in the liquid, especially in water which absorbing coefficient is 0.46 $m^{-1}$ accordingly to a wave length of 970 mm a thermical lens will be produced in the heated area. The lens and especially its flow inducing properties are measured to define the flow velocity of the liquid. The measurement is taken by means of the not-absorbed light of the same laser beam so that the initial beam and the measuring beam coincide. This method is a non-invasive, contact free thermical measuring method of the heat induced modifications of the optical properties of the heated fluid. The measurement is taken at the same point as the absolute heating point: i.e. heating point and measuring point coincide or overlap in the area. The detection of the laser beam takes place by an array of detectors with a few single-detectors (at least two) but at the same time a number of single-detectors collect the light of the light beam. Apart from the diffusion by the heat induced thermical lens, this procedure can be expanded by means of an additional lens or a group of optical lenses which are positioned outside and in front of the tube of the array of detectors. Herewith different properties of the heated area can be collected and not only its displacement (movement) but also its deformation, i.e. changes of the shape within the heated zone which result from the flow movement. In accordance with the invention the measurement is not just calculated by a global deflection of the light ray but a global measurement of a wider area is taken and therewith its flow induced properties, especially its deformations. The liquid is heated (contact free) by means of an optical beam. Especially the beam with its light irradiating through and which heats the liquid is detected.

In accordance with the preferred arrangement it is planned that the heating beam and the detector beam are sent by the same source or that they arise out of different sources. In the latter case, the sources of radiation can have the same or different frequencies. The production of the heating and the detection beam by means of a source of light can be achieved by separating the beams, by filtering through different optical filters and/or different expansions via different projection lenses.

Therefore the apparatus to heat an area of the liquid can also be a radiating source or light source like a laser which coincides with the measuring source. But, the direction of the radiation is especially this way that the heating ray and the detection ray are the same i.e. no separation of beams of one radiating or light source takes place.

In accordance with a preferred further development the measuring beam might have a wider intermediate diameter than the heating beam.

The optical beam can be either focused into the tube and therefore into the flow of the liquid or outside of it. Alternatively it can be transmitted in parallel direction.

In accordance with a preferred further development it might be planned that measurements can be taken serially by means of the array of detectors. If planned accordingly serial measurements could be taken during one laser pulse and the source of light is a modulated or pulsed laser.

Herewith the temporary development of the heating in the heating area which is influenced by the flow velocity can be detected.

While it might basically be planned that the detection takes place via a linear array of detectors and their position is planned in flow direction. A preferred arrangement is that the detection takes place via an array of two-dimensional detectors.

Further developments of the invention envision that the flow rate is determined by a received profile of the optical beam. Statistical moments of the received signals are especially calculated like the average value, variance, asymmetry and/or kurtosis. The flow velocity of the liquid will be determined by the decrease of statistical moments. Each defined (statistical) moment is connected to a different characteristic of the form of ray and therefore of the scope of the thermical lens as well as the flow velocity. Alternatively to the flow values received by the exponential characteristics of statistical moments during a period of time can be determined the displacement of the phases of (place shift) the statistical moments at a defined laser excitation frequency. Therefore it might be planned that the displacement of the average value of the position of the optical beam can be the reference for the low and/or that the decrease of the variance of the optical beam is determined by the flow. Other preferred developments of the invention envision that the intensity of the optical beam will be modulated and the displacement of the phases of the modulation will be determined so that the optical beam is modulated by numerous frequencies and/or the optical beam will be modulated stochastically.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 2.1 to 2.7 are schematic views showing diverse constructions of the optical heating and detection rays which shine through the liquid: partly in parallel direction, partly focused;

FIGS. 3.1, 3.2 are schematic views showing two constructions of the invention with different sources of beam for the heating and the detection ray while in FIG. 3.1 they shine in parallel direction and in FIG. 3.2 they are focused on an area inside the liquid;

FIG. 6.2 is a graphical view showing a diagram of the standard deviation for different kinds of flow (in ml/min)

DESCRIPTION OF THE PREFERRED EMBODIMENTS

Figure 1:
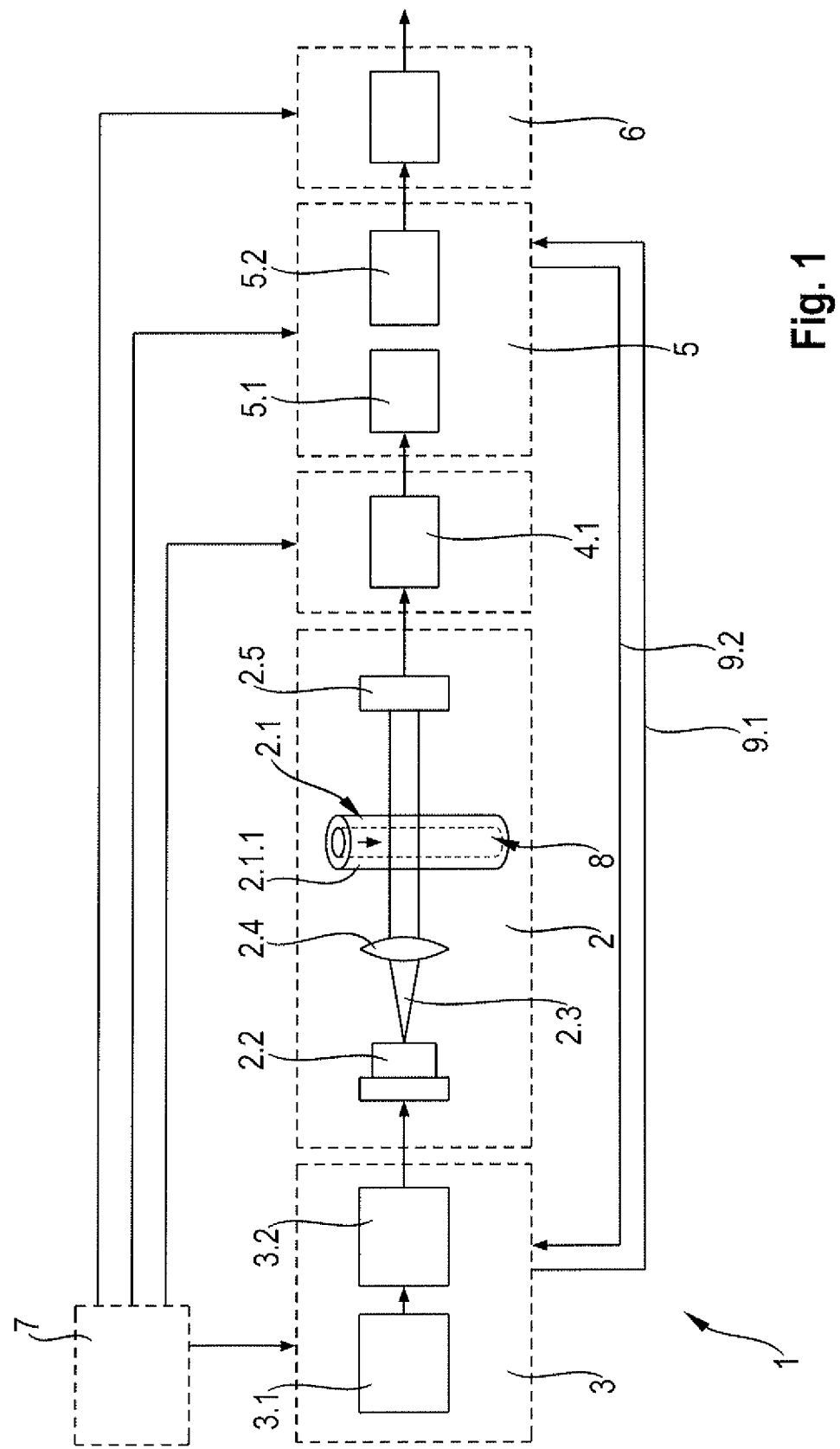
FIG. 1 is a schematic view of the invention apparatus.

Referring to the drawings in particular, FIG. 1, an apparatus in accordance with the invention 1 shows an optical arrangement 2, this demands laser technology 3, an array of amplifier 4, an electronic analyzing device 5 as well as an array of interfaces. Additionally, power supply 7 is needed for each electrical and electronical device.

A tube 2.1 filled with liquid 8 runs through the optical application 2. It needs transparent walls 2.1.1 e.g. made of glass at least for the measuring area and the measuring beam 2.3.

The optical arrangement shows a laser 2.2 as an optical source of light which might be run by e.g. a wavelength of 970±15 nm and with an output of 100 mW.

The optical beam 2.3 or the laser beam will be parallelized by means of the first lens 2.4, shines the tube 2.1 and onto an array of detectors 2.5 with numerous single-detectors. The array of detectors 2.5 is connected to an electronic amplifier 4.1.

The laser control 3 includes a modulator 3.1 and a laser driver unit 3.2 to control the laser 2.2.

An amplifier 4.1 is followed by an A/D converter 5.1 as well as a computer or processor, preferably as a digital processor 5.2 in an analyzing device 5. An interface allows the output of the calculated data onto a display, a memory device and/or a printer. If necessary, control cables 9.1, 9.2 are planned to adjust the laser control unit as well as the analysis control device and to react i.e. to control the laser operation.

The optical arrangement shown in FIG. 2.1 is equivalent to FIG. 1 and shows a lens 2.4 to parallelize the optical beam which radiates the tube in parallel direction and therefore radiates the liquid 8 which flows through the tube, too. The direction of the liquid flow is shown in case S.

In FIG. 2.2 an additional lens 2.6 is planned in front of the tube 2.1 which focuses the beam 2.2 in the inner part of the liquid 8. This will leave the liquid divergent and strike the array of detectors 2.5.

As shown in FIG. 2.3 an additional lens 2.7 is planned on the side of the tube which is directed away from the laser and which allows a further expansion of the beam 2.2 apart from the lenses 2.4 and 2.6.

FIG. 2.4 diverts from FIGS. 2.2 and 2.3 to such a degree as the light beam is focused through the lens 2.6 laser sided in front of the tube 2.1.

This equals FIG. 2.5 where also an expansion is achieved via the lens 2.7 on the side of the tube 2.1 which points away from the laser 2.2.

While in FIGS. 2.2 and 2.3 the focus lays in the interior of the liquid but on the side which points away from the laser 2.2 relatively to the symmetry axis; in FIG. 2.6 when looked at from the symmetry axis it lays on the side which points away from the laser and the side which points to the photo array 2.7 within the liquid.

Again, FIG. 2.7 shows as well as FIG. 2.1a beam in parallel direction. However, this is expanded via a lens 2.7 positioned on the side pointing away from the array of detectors 2.5 as shown in FIG. 2.5, 2.6.

In the description of FIGS. 1 and 2.1 to 2.7 it is assumed that the beam or the laser is an optical one which not only heats the liquid 8 in the tube 2.1 but also detects the optical lens which is produced during the heating process and whose shape is influenced by the flow, i.e. serves a heating as well as a measuring beam.

FIGS. 3.1 and 3.2 are showing apart from FIGS. 2.1 to 2.7 alternative designs with two different radiation or light sources 2.2, 2.8 for the detection beam 2.3 I. e. for the heating beam 2.10. The arrangement and the assembly for the measuring beam 2.3 equals FIG. 3.1. Basically it can be referred to the description of 3.2 as it equals FIGS. 2.1 and 2.2. The same parts are named the same. One radiation source 2.2 is planned for the measuring beam 2.3. A accumulative lens 2.4 is situated behind this in the same direction of radiation which parallelizes the detection ray 2.3 as shown in FIG. 3.1, 3.2. As an alternative and further development of FIG. 2.1. 2.2, this beam radiates through a mirror which is partly permeable and positioned in an angle of 45 in direction of the radiation before t shines through the tube 2.1 and through the flowing liquid 8. In FIG. 3.1 the detection ray shines through the tube 2.1 in parallel direction and through the foaming liquid before reaching the array of detectors 2.5.

In FIG. 3.2 the measuring beam 2.3 will be directed into the interior of the tube 2.1 after passing the partly permeable mirror 2.11 by means of the accumulative lens 2.6. Herewith the interior will be focused by the flowing liquid 8 with the result that the divergent ray will reach the array of detectors 2.5.

The frequency and the capacity of the detection beam are chosen the way that they do not considerably heat the liquid 8.

Hereunto a second radiation or light source 2.8 is planned which radiates a heating beam 2.10. Initially, this beam shines through a accumulative lens 2.9 and will be parallelized like the beam 2.3 which shines through the accumulative lens 2.4. Then it will reach the side of the partly permeable mirror 2.11 which is directed towards the tube 2.1 and will be reflected by 90° that its optical axis coincides with the detection beam 2.3 after the mirroring. As shown in FIG. 3.2 the heating beam 2.10 will shine through the accumulative lens 2.6, too and will be focused in the inside of the liquid 8; unlike in FIG. 3.1 where it will radiate into the liquid as a beam in parallel direction.

Figure 4:
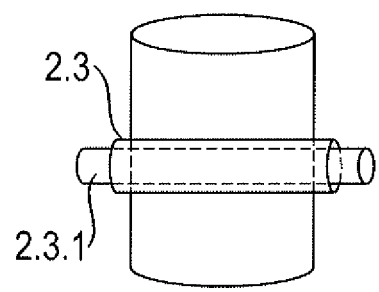
FIG. 4 is a view showing the lateral cut of the proportions of the measuring and heating beam if they do not coincide.

While as a simplification the beams in FIGS. 3.1 and 3.2 are shown with coincident lateral cut measurements and beam guidance after mirroring, these can vary as shown in FIG. 4 and explained as follows.

Additionally, if needed, it is possible that the detection beam radiates through the liquid in parallel direction and to focus the heating beam 2.10 into the interior and vice versa, i.e. the heating beam shines through the liquid and the detection beam is focused into the interior or in any other way as shown in FIGS. 2.3 to 2.6. Herewith if necessary the partly permeable mirror 2.11 can be positioned behind the collecting lens in accordance with the preferred focus of the ray i.e. whether in line with the measuring beam 2.3 or with the heating ray 2.10. Additionally further designs as FIGS. 2.3, 2.5 to 2.7 are possible i.e. a dispersing lens 2.7 for the detection ray after it passed the tube 2.1 and the liquid 8 as shown in the drawing 2 as well as different radiation sources for the measuring beam 2.3 and the heating beam 2.8.

FIG. 4 is provided with two beams. Next to the measuring beam 2.3 a separate heating beam 2.3.1 is positioned. It is important that the latter owns a diameter which is equal or smaller than the diameter of the measuring beam 2.3. In the drawing example the measuring beam 2.3 and the heating beam 2.3.1 are routed coaxially. They can origin from one light source or different light sources and be positioned as shown in the drawing.

The laser 2.2 is a modulated or pulsed one with the result that the laser beam will be a modulated or pulsed one 2.3, too.

With the planned array of detectors 2.5 with numerous single detectors in which the array detectors 2.5 can be linear or a two-dimensional one not simply the local deflection of the laser beam through the lens is determined but herewith the global properties of the appearing thermal lenses can be determined. Numerous measurements are taken over a period of time—during a laser pulse—so that the specified time behavior of development of the thermical lens can be determined which is enormously influenced by the flow velocity of the liquid of the development of the thermical lens can be collected. To get a detailed analysis of the flow properties four statistical analyses of the signals received are evaluated by means of the analyzing device 5: especially to determine location of the first moments as an average value, the second moment as a variance and the third moment as the statistic skewness as well as of the fourth moment as kurtosis.

A local increase of temperature which is directly connected to the laser intensity and causes an irregular distribution of the temperature in the liquid is achieved by irradiating light energy, especially laser energy into the liquid 8. Herewith the effect of a thermical lens is induced which influences the light ray and therefore the intensity which is absorbed by the array of detectors or the capacity profile is modified. The temperature distribution changes with the flow of the liquid and accordingly, the profile of the received light capacity. This change in connection with the laser control is used to determine the flow properties of the flowing liquid.

If the liquid is not flowing, the intensity- or the capacity profile of the received radiation is symmetrical and the effect of the thermical lens is a decrease of the width of the intensity profile. (However an expansion of the laser ray could occur depending on the physical configuration of the system and the laser focus). The temperature profile will not be symmetrical when the liquid is flowing.

Figure 5:
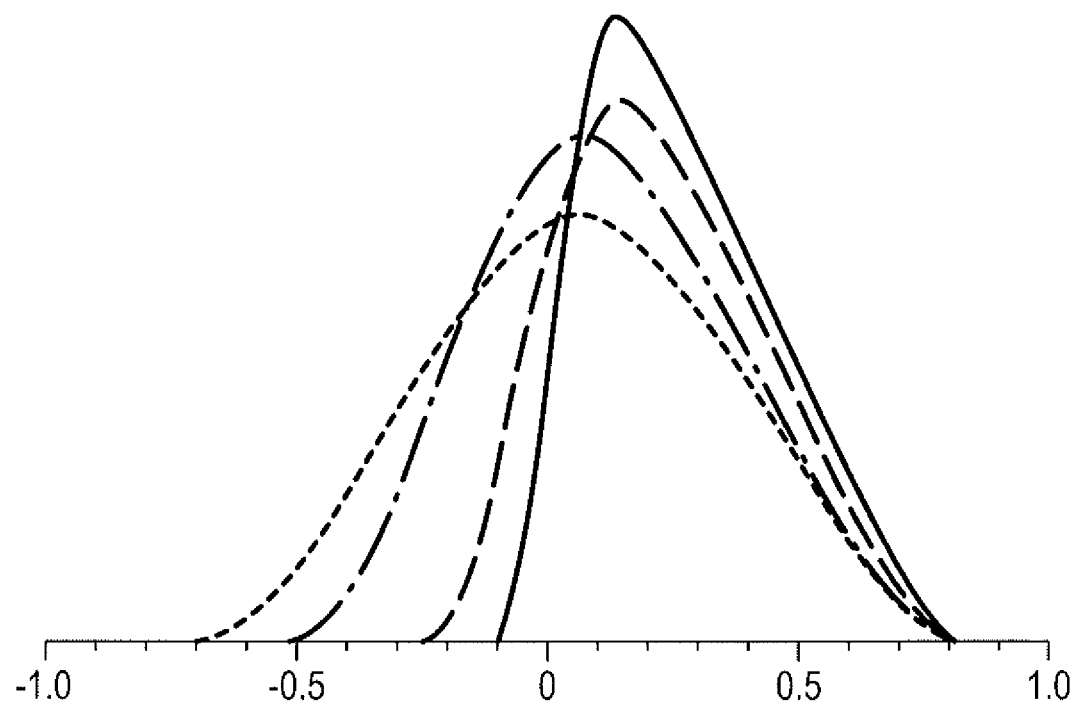
FIG. 5 is a graphical view showing the development of the distribution curves of the measuring beam at different points of time in the direction of the flow.

As shown in FIG. 5, this results in a different laser intensity allocation from the position which it would have if the liquid would stand still and will not become symmetric. These deviations are experimentally used to determine characteristic or properties of liquid flows, e.g. flow rate or volume flow rate in which the flow velocity and flow rate are directly connected via the diameter of the tube.

If a laser is working with pulse modulation measurements are taken during the pulse and the signals received are analyzed. The period of time and the frequency of the pulse are preferably adapted to the time constant of the system. The constants depend upon the physical configuration of the system like the distance between the parts, the focus of the laser beam and the area of the flow rate which has to be determined. Since the temperature increases when the laser is enabled the laser capacity- or intensity profile changes with the time, too. This change depends on the velocity of the liquid within the system and therefore the flow rate. It was noticed that the change of the middle position or the position average value of the laser intensity rate and its width (standard deviation) are related to the velocity of flow. Accordingly, due to each detector element of the array of detectors which are positioned in direction of flow the (local) average value and the standard deviation of the received light intensity can be determined as usual.

Figure 6:
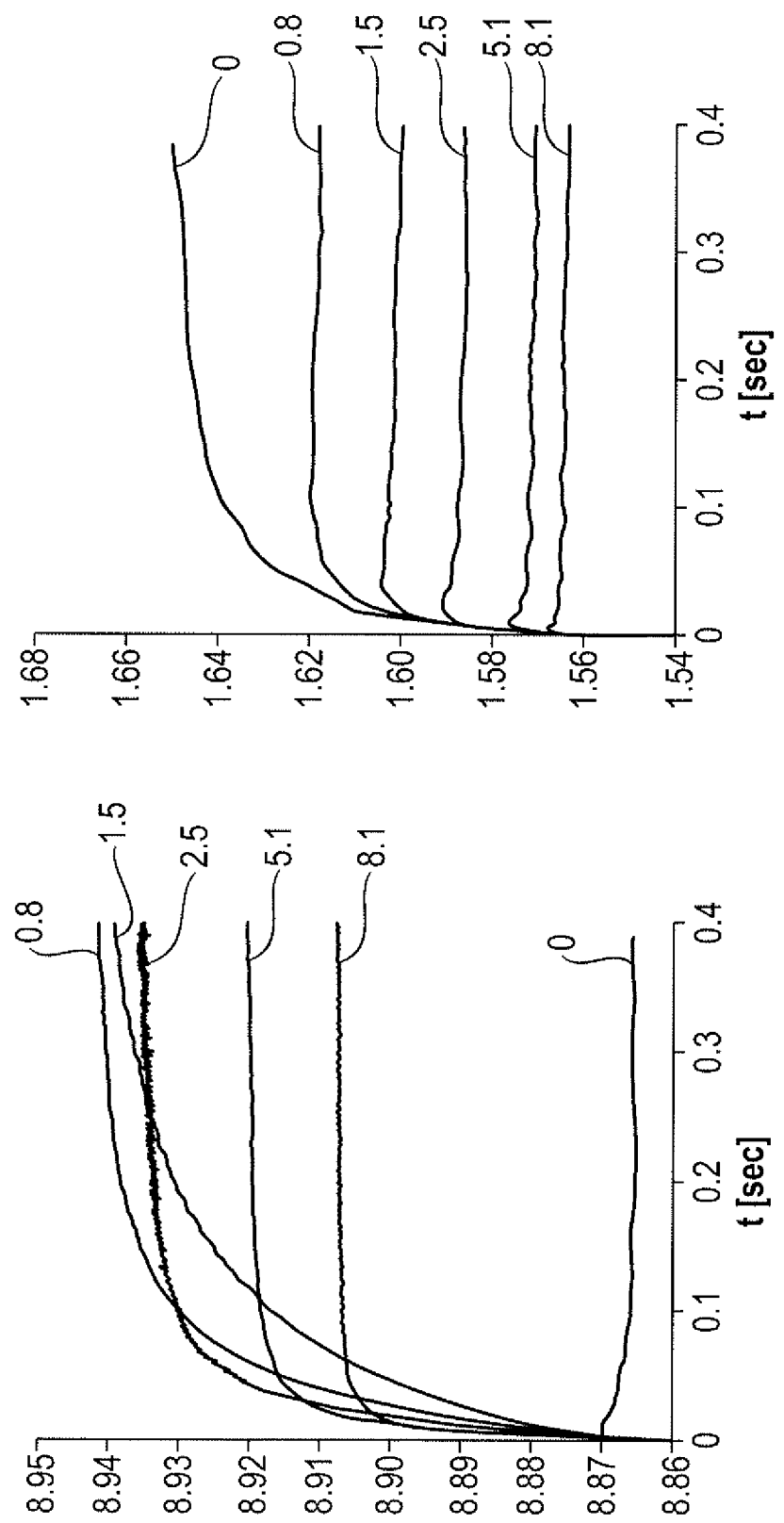
FIG. 6.1 is a graphical view showing a diagram of the average value for different flow rates (in ml/min)

It can be seen that FIGS. 6.1 and 6.2 show an exponential disintegration and similar time response. Moments of higher folder i.e. skewness and kurtosis can be determined accordingly and are likewise related to the rate of flow. These kinds of data can be seen as an example of received data projection into a data subspace whereby different contributions can be split up into signals with the result that the rate of flow can be improved.

As it can be seen in the drawings the average value can e.g. be approached by a model like $\mu(t) \cong \alpha_o + \alpha_e e^{-t/\tau}$ or $\mu(t) = \gamma + \tau \beta_i \tan h (\alpha_i t)$ (all whereas the last model shows a better convergence and the sensitivity is reduced compared to the initial conditions.

The parameters of the example formula have to be adapted to the flow rate although apart from the linear the non-linear models linear models can be taken into consideration as well.

The algorithm which is developed for a pulsed laser excitation offers an exponential answer of the system. Such answer equals an auto-regressive first order model in a filter theory. It was diagnosed that the time constant of the exponential model which shows the development of the average value position is closely related to the flow rate. Expecting that the system reacts as an auto-regressive first order the responding phase will vary with the flow rate. It is also possible to determine the flow rate if therefore the initial laser capacity is changed with a cosine function and the phase displacement is determined between the received middle laser capacity position (or moments of higher order) and the modulated initial signal. Problems can occur if the flow rate is achieved by means of pumping the liquid and the pump frequency lies close to the modulation frequency. These can be resolved by modulating the laser with two different frequencies and determine the flow rate by both of them together. But the received signal around each frequency has to be filtered. Another solution could be detecting the interfering interactions and to change the modulation frequency. Additionally, different modes of vibration within the sensor can be separated by means of a PCA—Principle Component Analysis.

Figure 7:
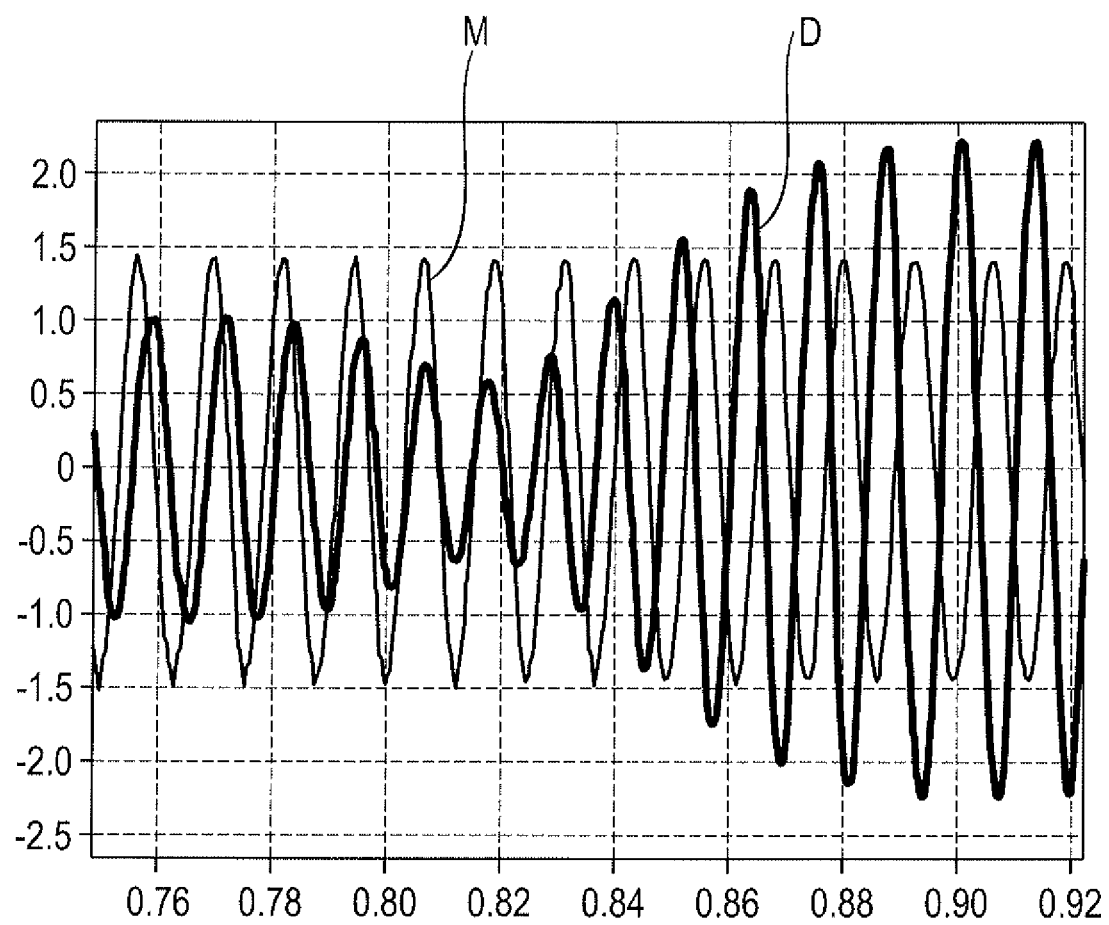
FIG. 7 is a graphical view showing a diagram of the displacement of phases in accordance with the initial modulation and the received optical radiation.

The variation of the phase displacement D from the original modulation signal M in accordance with the velocity is shown in FIG. 7.

It is advantageous to use numerous modulation frequencies to modulate the laser. This allows expanding the area of the flow rates which has to be controlled. The resolution e.g. is better at a minor flow rate of typically 0 to 6 mm/min (and an internal tube diameter of 4 mm) at a low modulation frequency of e.g. 10 Hz while the measuring area can be expanded up to 25 mm/min using a higher modulation frequency of e.g. 80 Hz.

While using a pulsed laser the information taken over a period of time of the received signals are taken into consideration to determine the flow rate during the modulation of the output intervals of the laser the chronological as well as the frequent response at chosen frequencies are taken into consideration. To benefit from the whole time-frequency-area the noise to control the laser can be taken into consideration (e.g. the white noise filtered if necessary). This results in covering a further frequency area. Analyzing the system's response and therefore the transmission rate a connection can be drawn between this rate and the flow rate.

While specific embodiments of the invention have been described in detail to illustrate the application of the principles of the invention, it will be understood that the invention may be embodied otherwise without departing from such principles.

The invention claimed is:

1. A method for determining a flow of a flowing liquid, the method comprising the steps of:
   heating a fluid by means of an optical heating beam, said heating beam being intensity-modulated or pulsed;
   irradiating a heating location by an optical detection beam, wherein optical axes of the heating and at least one detection beam coincide at least at the heating location, the at least one detection beam being absorbed by an array of detectors, wherein an angle between said heating optical heating beam and said at least one detection beam is zero at least at said heating location, said array of detectors carrying out a plurality of temporally successive measurements during heating; and
   determining at least a statistical moment of a variance of said at least one detection beam influenced by said heating location, wherein a time profile of a refractive index of said heating location in the fluid is determined based on said plurality of successive measurements.

2. A method according to claim 1, wherein the heating beam and said at least one detector beam are emitted from a same radiation source.

3. A method according to claim 1, wherein the heating beam and said at least one detector beam are emitted from different radiation sources.

4. A method according to claim 1, wherein the detection beam has a greater mean diameter than the heating beam.

5. A method according to claim 1, wherein one or more of the heating optical beam and said at least one detection beam are optical beams or laser beams focused on a region inside the liquid.

6. A method according to claim 1, wherein the one or more beams irradiating the liquid are parallel beams.

7. A method according to claim 1, wherein the one or more beams are modulated optical beams.

8. A method according to claim 1, wherein a detection of said at least one detection beam is carried out by means of a linear array of detectors.

9. A method according to claim 1, wherein a detection of said at least one detection beam is carried out by means of a planar (two-dimensional) array of detectors.

10. A method according to claim 1, wherein the flow is determined from a received profile of the at least one detection beam.

11. A method according to claim 1, wherein a flow velocity of the liquid is determined by determining a decrease in statistical moments.

12. A method according to claim 1, wherein determining said statistical moment of received signals includes determining one or more of mean value, variance, skewness and kurtosis.

13. A method according to claim 12, wherein a shift in the mean value of a position of the at least one detection beam is determined as a measure for the flow.

14. A method according to claim 12, wherein the modification of the variance of the at least one detection beam is determined with the flow.

15. A method according to claim 1, wherein an intensity of the at least one detection beam is modulated and a phase shift of the modulation and of a measurement is determined.

16. A method according to claim 15, wherein the at least one detection beam is modulated with numerous frequencies.

17. A method according to claim 15, wherein the at least one detection beam is stochastically modulated.

18. An apparatus for determining a flow of a liquid, the apparatus comprising:
   a tube, through which a fluid flows, said tube having a wall, which is at least partially transparent for a measuring beam;
   a device for heating at least a location inside the liquid, said device generating an intensity-modulated or pulsed heating beam;
   a laser for generating a detection beam; and
   an electronic evaluation device, wherein the device for heating a defined inner location of the liquid and an optical arrangement guiding the detection beam of the laser are positioned in such a way that detection beam irradiates the heated location, said heating beam being located at an angle of zero with respect to said detection beam at least in said heated location, wherein an array of detectors is provided for receiving the detection beam, and the evaluation device is configured for determining at least a statistical moment of a variance of said detection beam influenced by said heating location, said array of detectors carrying out successive measurements during heating, wherein a time profile of a refractive index of said heated location in the fluid is determined based on said successive measurements.

19. An apparatus according to claim 18, wherein the device for heating the flowing liquid is a laser.

20. An apparatus according to claim 18, wherein the laser, which produces the measuring beam, is the device for heating the liquid.

21. An apparatus according to claim 20, wherein the optical arrangement is such that the detection beam and the heating beam is not split when transmitted through the liquid.

22. An apparatus according to claim 18, wherein said optical arrangement comprises a focusing lens for focusing said heating beam and said detection beam inside the liquid flow.

23. An apparatus according to claim 18, wherein said optical arrangement comprises a lens for parallelizing and irradiating the liquid by means of a parallel beam.

24. An apparatus according to claim 18, wherein the one or more lasers are modulated lasers.

25. An apparatus according to claim 18, wherein the apparatus is configured for taking multiple temporally sequential measurements.

26. An apparatus according to claim 24, wherein the apparatus is configured for taking multiple temporally sequential measurements during a laser pulse.

27. An apparatus according to claim 18, wherein the array of detectors is a linear array of detectors.

28. An apparatus according to claim 18, wherein the array of detectors is planar/two-dimensional.

29. An apparatus according to claim 18, wherein the evaluation device is configured for determining statistical moments of received signals, said statistical moments being one or more of mean value, variance, statistical skewness and kurtosis.

30. A method for determining a flow of a flowing fluid, the method comprising the steps of:

heating a fluid by via an optical heating beam;

irradiating a heating location with at least one optical detection beam, wherein optical axes of the heating beam and said at least one detection beam coincide at least at the heating location, the at least one detection beam being absorbed by an array of detectors, wherein said heating beam is parallel to said at least one detection beam at least at said heating location, said array of detectors carrying out a plurality of successive measurements during heating; and determining a time profile of a refractive index of said heating location in the fluid determined based on said plurality of successive measurements.

31. A method according to claim 30, further comprising:

determining at least a statistical moment of a variance of said at least one detection beam influenced by said heating location.

* * * * *